United States Patent Office 2,998,198
Patented Aug. 29, 1961

2,998,198
VARIABLE SIZE FLOW NOZZLE
Charles E. Young, Copper Cliff, Ontario, Canada, assignor to The International Nickel Company, Inc., New York, N.Y., a corporation of Delaware
Filed Jan. 25, 1960, Ser. No. 4,412
Claims priority, application Canada Oct. 7, 1959
6 Claims. (Cl. 239—455)

The present invention relates to a variable size flow nozzle of the sphincter type and, more particularly, to a pneumatically adjustable, variable size flow nozzle for handling slurries and the like which maintains its nozzle shape when the orifice therein is restricted in cross sectional dimension over a wide range.

It is known that solutions and mixtures containing a high proportion of solid materials cannot be handled by the ordinary types of valves and which are adapted for handling clear liquids. There are many applications in which it is necessary to control the flow of a slurry as, for example, in connection with roasting operations wherein a slurry is fed to the roaster, the control of thickener underflows, hydroclone underflows, etc. In connection with these applications, it is very desirable that a variable size flow nozzle be provided which will retain its nozzle characteristics over a wide range of nozzle openings.

A number of proposals for solving the problem of controlling the flow of slurries and the like by means of valves having a flexible throat have been made in the art. The usual valves employed for this purpose assume the form of a narrow slit as the valve approaches the closed position. The slit thereupon may become partially plugged by the lodging therein of the larger solid particles in the feed and the nozzle characteristics of the valve are destroyed.

I have now discovered an improved variable size flow nozzle particularly adapted for controlling the rate of flow of slurries and the like, which nozzle retains its nozzle characteristics when the opening therein is varied in cross sectional dimension over a wide range.

It is an object of the present invention to provide an improved variable size flow nozzle having the distinctive features of retaining its nozzle characteristics even though the opening therein is restricted over a wide range.

It is another object of the invention to provide an improved pneumatically operated sphincter-type flow nozzle.

It is a further object of the invention to provide a variable size sphincter-type flow nozzle which retains its nozzle characteristics over a wide range of adjustment of the nozzle orifice and which is adapted to be controlled from a remote point.

Other objects and advantages of the invention will be made apparent from the following description taken in conjunction with the drawing, in which.

Generally speaking, the present invention is directed to a sphincter-type flexible flow nozzle device comprising a relatively elongated, smooth nozzle throat provided with laterally extending, radial flanges at each end thereof. Preferably, the nozzle is made of an elastomeric material such as rubber. In use, the flange at the inlet end of the nozzle is supported by a surface while the laterally extending flange at the opposite or outlet end of the nozzle is fastened at the periphery thereof. This outlet end flange is constructed to be inwardly extensible or flexible as, for example, by providing at least one circumferential bulge therein between the nozzle proper and the periphery of the flange. This circumferential bulge provides excess stock in the outlet end flange and contributes inward extensibility to the aforementioned outlet end flange permitting contraction of the nozzle without distorting the nozzle shape thereof.

Figure 1:
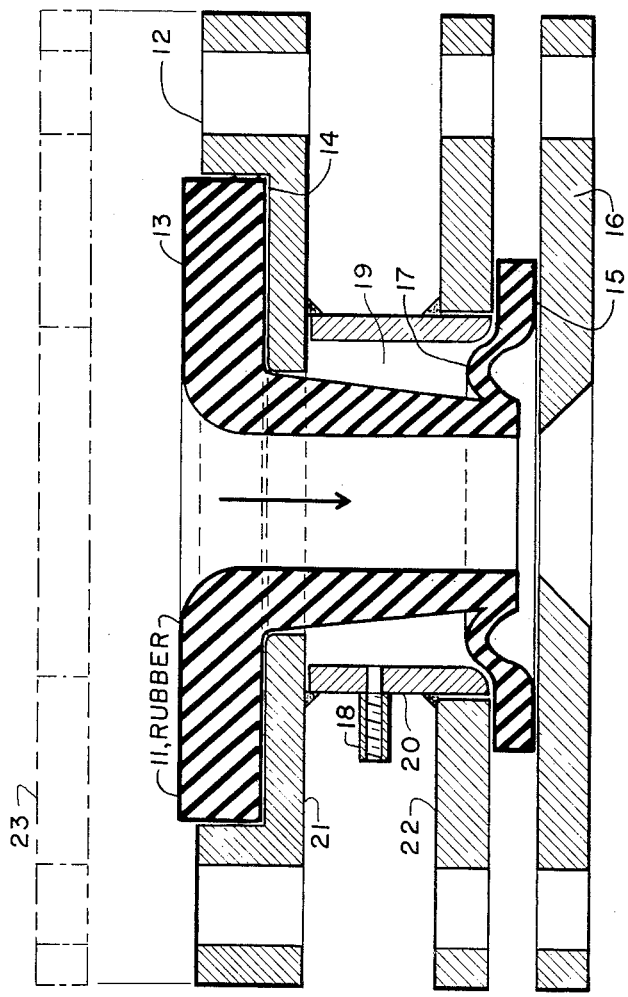
FIGURE 1 depicts the variable size flow nozzle contemplated in accordance with the invention assembled in a metal fixture particularly adapted to hold the nozzle and to provide a plenum chamber for the application of pneumatic pressure to the flow nozzle so as to vary the size thereof.

Turning now to FIGURE 1, reference character 11 depicts the variable size flow nozzle contemplated in accordance with the invention, which flow nozzle desirably is made of an elastomeric material such as rubber. Flow nozzle 11 is provided with inlet flange 13 and outlet flange 15. Inlet flange 13 is shown substantially heavier in section than outlet flange 15 and outlet flange 15 is shown provided with a circumferential bulged portion 17 which permits inward extensibility of the nozzle outlet. Flow nozzle 11 is mounted in fixture 12 such that a circumferential plenum chamber 19 is formed about the throat of nozzle 11. Fixture 12, which may be made of a metal such as steel, itself advantageously comprises a hollow body member 20 which may be tubular in form and which is provided with laterally-extending flanges 21 and 22 at the ends thereof. The outer faces of flanges 21 and 22 of fixture 12 are adapted to fit the inner faces of flanges 13 and 15 and to form therewith an air-tight seal such that the plenum chamber 19 will be substantially air-tight. Compressed air may be admitted through nozzle 18 into plenum chamber 19. Outlet end flange 15 of nozzle 11 may be fixed in position by compression applied between orifice plate 16 and flange 22. In this manner, flexing movement of the circumferential bulged portion 17 in nozzle outlet end flange 15 is facilitated. A second plate (indicated in outline at 23 which may be an orifice plate or a flange on a valve such as a plug valve and has a large orifice diameter so as not to interfere with smooth flow of material into the nozzle 11) may be provided to fix inlet flange 13 of nozzle 11 by compression applied between orifice plate 23 and flange 21 of fixture 12. Advantageously, flange 13 on nozzle 11 may be set into a recess in flange 21 of fixture 12 as shown at 14. The flexible nozzle 11 is compressed inwardly by admission of compressed air into the plenum chamber.

Figure 2:
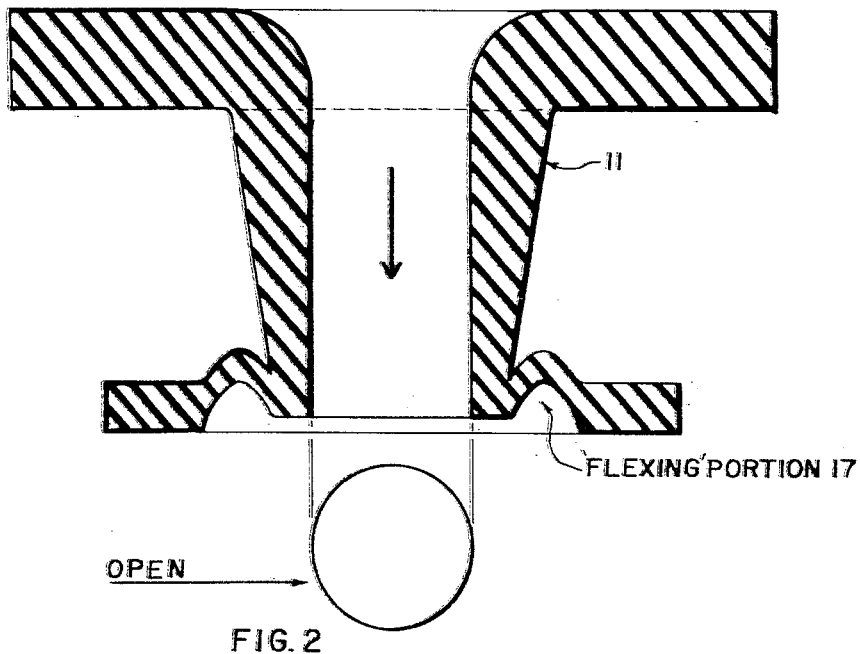
FIGURE 2 depicts a variable size flow nozzle contemplated by the invention in the open position.
Figure 3:
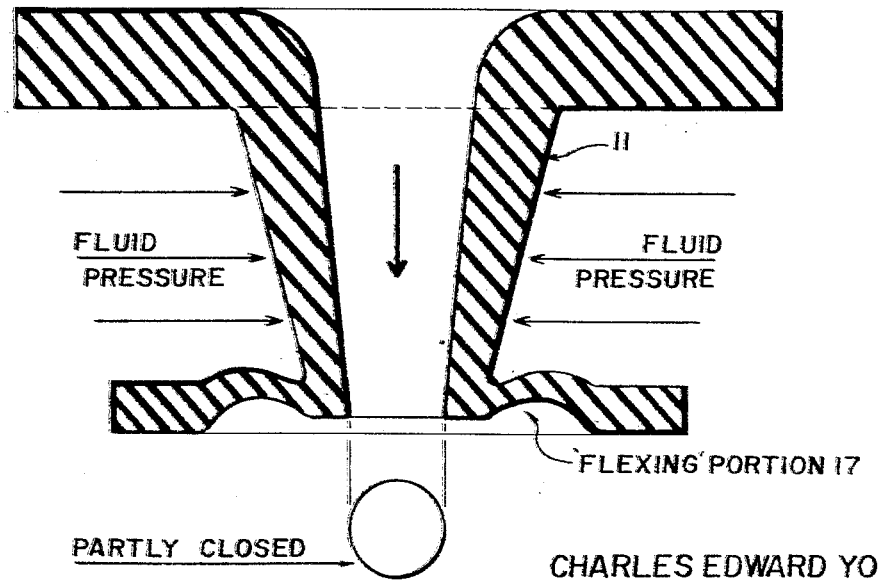
FIGURE 3 depicts the variable size flow nozzle contemplated in accordance with the invention in the partly closed position.

FIGURE 2 illustrates a cross section through the flexible variable size flow nozzle 11 taken axially therethrough. As shown in FIGURE 2, the cross section of the outlet end of the nozzle 11 in the open position is essentially circular. FIGURE 3 is an axial cross section of the variable size flow nozzle in the partly closed position. As shown in FIGURE 3, the outlet end of the nozzle is substantially restricted in size but has remained circular. As also shown in FIGURE 3, the circumferential, bulged, flexing portion 17 provided in the outlet flange 15 has permitted substantial inward extension or flexing of the outlet end flange without distortion of the nozzle shape.

As shown in the drawings, it is desirable that the nozzle throat of the variable size flow nozzle be essentially cylindrical when the flow nozzle is at rest and that the nozzle throat be converging or frusto-conical in section when the nozzle is in the partly closed position. It is also desirable that the throat of the flow nozzle have substantial length, i.e., that the ratio between diameter and length of the flow nozzle throat should be at least about 1:2 to about 1:3. The wall of the throat portion of the nozzle advantageously increases smoothly in thickness from the outlet end to the inlet end thereof, i.e., the said wall has a tapered cross section. It is advantageous that the inlet flange 13 be substantially heavier in section than the wall of the nozzle throat at the outlet end thereof and that a smooth radius be provided between the inlet end flange face and the inner connecting face of the nozzle throat. It is desirable in all circumstances that entrance of fluid to the nozzle be smoothly effected.

In using the flexible flow nozzle having the variable nozzle opening as provided in accordance with the invention for handling slurries and the like, the nozzle may be located, for example, at the bottom of a feed tank for feeding slurry to a roaster. The nozzle may also be employed in the outlet of a thickener or of a hydroclone to regulate the underflow therefrom.

It will be seen that the nozzle opening of the variable size flow nozzle contemplated in accordance with the invention is regulatable at will depending upon the pressure applied in the plenum chamber. This factor enables control of the size of the orifice opening in the nozzle at will and readily permits control of the nozzle from a remote point.

In constructing the variable size flow nozzle contemplated in accordance with the invention, it is desirable that the rubber material used for constructing the flow nozzle be sufficiently flexible to allow the orifice to contract with reasonable control pressures, e.g., pressures up to about 75 pounds per square inch gauge applied in the plenum chamber. In one application, rubber of shore number 40 was found very suitable.

The variable size flow nozzle provided in accordance with the invention is characterized by the fact that the nozzle orifice provided thereby retains its nozzle characteristics over a wide range of nozzle size. Thus, the cross sectional area of the nozzle may be varied over a wide range, for example, over a range of about 4 to 1 without changing the nozzle characteristics thereof. This feature of the variable size flow nozzle provided in accordance with the invention provides even and "splash-free" flow of material through the nozzle contemplated in accordance with the invention. In addition, the fact that the nozzle size is controlled by fluid pressure allows instant and remote regulation of the nozzle opening.

The flexible flow nozzle contemplated in accordance with the invention is particularly suitable for controlling the flow of liquids and of slurries containing up to about 80% solids, e.g., about 75% solids. Thus, in one installation, the variable size nozzle has been used to control the flow of pyrrhotite pulp containing about 75% solids from a constant head tank to a fluid bed roaster. The nozzle permitted regulation of the slurry feed rate in the range of about 15 tons per hour to about 25 tons per hour. Since a constant feed head was applied, the feed rate varied directly with the nozzle opening.

It will be appreciated from the foregoing description that the flow nozzle contemplated in accordance with the invention is characterized by a smoothly contoured inlet portion, a throat portion which has straight sides, e.g., cylindrical, when the nozzle is fully open and which has converging sides when the nozzle is partly closed and which has a circular cross section in the inlet and throat.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A variable size flow nozzle of elastomeric material comprising a throat portion substantially longer than the diameter thereof and having substantially cylindrical configuration when at rest, an inlet flange and an outlet flange each extending radially from said throat portion, said inlet flange defining an inlet end in said flow nozzle of substantially fixed circular cross section and said outlet flange defining an outlet end in said flow nozzle and being provided with at least one unrestrained circumferential bulged portion permitting free inward extensibility of said flange, said throat portion in the partially closed position converging substantially uniformly from said inlet end to said outlet end while retaining its circular cross section throughout its length.

2. A variable size flow nozzle according to claim 1 wherein the ratio of nozzle diameter to nozzle throat length is from about 1:2 to about 1:3.

3. A variable size flow nozzle according to claim 1 having a plenum chamber about the throat portion thereof to permit adjustment of the nozzle opening by application of fluid pressure in said plenum chamber.

4. A variable size flow nozzle according to claim 1 wherein the inlet flange is of sufficient sectional thickness that the nozzle throat does not substantially decrease in diameter at the inlet end upon the inward extension of the outlet flange.

5. A valve for regulating the flow rate of liquids and slurries comprising the combination of a variable size flow nozzle of elastomeric material having a throat portion substantially longer than the diameter thereof and a metal fixture forming a plenum chamber about said throat portion, said throat portion having a substantially cylindrical configuration when at rest and having a radially extending flange at the inlet end of said nozzle and a radially extending flange at the outlet end of said nozzle, said inlet flange being held substantially in a fixed position and defining an inlet end in said flow nozzle of substantially fixed circular cross section and said outlet flange being fixed at the periphery thereof and being provided with at least one unrestrained circumferential bulge permitting free inward extensibility of said outlet flange without causing distortion of the cross-sectional shape of the nozzle, said throat portion, upon inward extension of said outlet flange by application of fluid pressure in said plenum chamber, converging substantially uniformly from said inlet end to said outlet end while retaining its circular cross section throughout its length.

6. A valve for regulating the flow rate of liquids and slurries according to claim 5 wherein the ratio of flow nozzle diameter to flow nozzle throat length is from about 1:2 to about 1:3.

References Cited in the file of this patent

UNITED STATES PATENTS

| | | |
|---|---|---|
| Re. 24,534 | Dahl | Sept. 16, 1958 |
| 2,518,625 | Langstaff | Aug. 15, 1950 |
| 2,587,188 | McFadden | Feb. 26, 1952 |